United States Patent [19]

Büch

[11] Patent Number: 5,079,347
[45] Date of Patent: Jan. 7, 1992

[54] WATER-SOLUBLE DISAZO COMPOUNDS HAVING A HALOGEN-SUBSTITUTED S-TRIAZINYL RADICAL, SUITABLE AS DYESTUFFS

[75] Inventor: Holger M. Büch, Hofheim am Taunus, Fed. Rep. of Germany

[73] Assignee: Hoechst Aktiengesellschaft, Frankfurt am Main, Fed. Rep. of Germany

[21] Appl. No.: 280,682

[22] Filed: Dec. 6, 1988

[30] Foreign Application Priority Data

Dec. 8, 1987 [DE] Fed. Rep. of Germany ....... 3741508

[51] Int. Cl.$^5$ .................. C09B 62/09; C09B 62/513; D06P 1/38; D06P 3/66
[52] U.S. Cl. .................. 534/637; 534/582; 534/598; 534/887
[58] Field of Search .......................... 534/637

[56] References Cited

U.S. PATENT DOCUMENTS

| | | | |
|---|---|---|---|
| 3,050,515 | 8/1962 | Gunst | 534/637 X |
| 3,340,247 | 9/1967 | Riat et al. | 534/637 |
| 4,089,895 | 5/1978 | Jager | 534/637 X |
| 4,663,440 | 5/1987 | Omura et al. | 534/637 |
| 4,798,887 | 1/1989 | Krueger et al. | 534/637 |
| 4,801,693 | 1/1989 | Schaffer et al. | 534/637 |

FOREIGN PATENT DOCUMENTS

| | | | |
|---|---|---|---|
| 0042108 | 12/1981 | European Pat. Off. | 534/637 |
| 3517366 | 11/1986 | Fed. Rep. of Germany | 534/637 |
| 1102204 | 2/1968 | United Kingdom | 534/637 |

*Primary Examiner*—Mary C. Lee
*Assistant Examiner*—Fiona T. Powers

[57] ABSTRACT

Disazo compounds conforming to a general formula (1) shown below which have fiber-reactive dye properties and dye hydroxy- and/or carboxamido-containing fiber materials, such as wool and in particular cellulose, in strong fast shades.

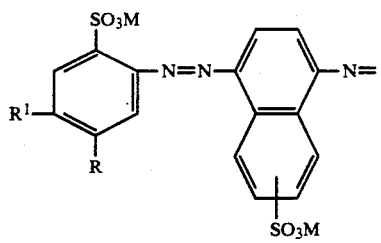

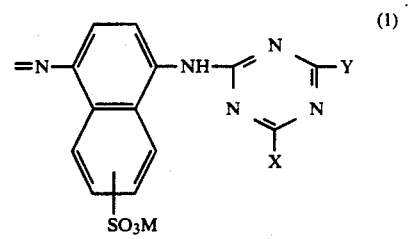

(1)

where
R is a hydrogen atom or a sulfo group,
R$^1$ is a hydroxy group, a methoxy group or an ethoxy group,
M is a hydrogen atom or an alkali metal,
X is a chlorine atom or a fluorine atom,
Y is a chlorine atom or an amino group or a group of the general formula (2)

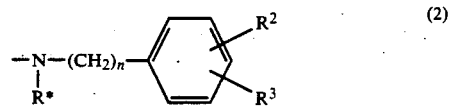

(2)

where
R* is a hydrogen atom or a methyl or ethyl group,
n is zero, 1 or 2,
R$^2$ is a hydrogen atom or a sulfo group or a β-sulfato-ethylsulfonyl group or a vinylsulfonyl group, and
R$^3$ is a sulfo group or a β-sulfatoethylsulfonyl group or a vinylsulfonyl group,
it being possible for R$^2$ and R$^3$ to be identical to or different from each other.

13 Claims, No Drawings

WATER-SOLUBLE DISAZO COMPOUNDS HAVING A HALOGEN-SUBSTITUTED S-TRIAZINYL RADICAL, SUITABLE AS DYESTUFFS

The present invention relates to the field of fiber-reactive azo dyes.

European Patent Application Publication No. 0,042,108A, German Offenlegungsschrift No. 3,517,366 and British Patent Specification No. 1,102,204 disclose phenylazonaphthyl-azonaphthylamino compounds to whose amino group a fiber-reactive aminochlorotriazinyl radical is bonded. These known disazo compounds give dyeings having a brown shade; however, their dye properties are still in need of improvement.

The present invention now provides novel useful disazo compounds conforming to the general formula (1)

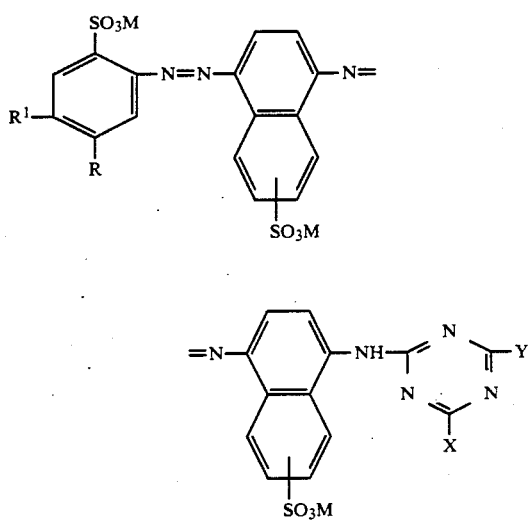

which have very good fiber-reactive dye properties, an increased color strength compared with the abovementioned known disazo compounds and, furthermore, a high light fastness and the reddish brown hue required for use in trichromatic dyeing.

In this formula (1) the variables have the following meanings:

R is a hydrogen atom or a sulfo group, $R^1$ is a hydroxy group, a methoxy group or an ethoxy group, preferably a methoxy group, M is a hydrogen atom or an alkali metal, such as sodium, potassium or lithium, X is a chlorine atom or a fluorine atom, preferably a chlorine atom, Y is a chlorine atom or an amino group or a group of the general formula (2)

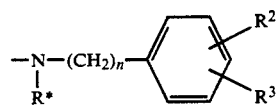

where $R^*$ is a hydrogen atom or a methyl group or an ethyl group, preferably a methyl group, n is 0, 1 or 2, preferably 0, $R^2$ is a hydrogen atom or a sulfo group or a β-sulfatoethylsulfonyl group or a vinylsulfonyl group, preferably a hydrogen atom or a sulfo group, and $R^3$ is a sulfo group or a β-sulfatoethylsulfonyl group or a vinylsulfonyl group, preferably a sulfo group or a β-sulfatoethylsulfonyl group, it being possible for $R^2$ and $R^3$ to be identical to or different from each other, and the sulfo groups in the naphthylene radicals preferably being independently of each other in the 6- or 7-position.

Preferably, Y is a chlorine atom or a group of the general formula (2) where $R^*$ is a hydrogen atom or a methyl group, n is 0 and $R^2$ and $R^3$ have the abovementioned, in particular the preferred, meanings.

Preference is given in particular to disazo compounds of the general formula (1) where X and Y are each a chlorine atom, $R^1$ is a methoxy group and R is a hydrogen atom.

Hereinbefore and hereinafter, a sulfo group is a group of the general formula $-SO_3M$ and a sulfato group is a group conforming to the general formula $-OSO_3M$, in each of which M has one of the abovementioned meanings.

The disazo compounds according to the invention can be present in the form of their free acid and preferably in the form of their salts, and particularly neutral salts, such as alkali metal salts. The disazo compounds of the general formula (1) are used, preferably in the form of these salts, for dyeing and printing hydroxy- and/or carboxamido-containing fiber material.

The present invention further provides processes for preparing the disazo compounds according to the invention. They can be prepared according to the invention by reacting an amino-disazo compound of the general formula (3)

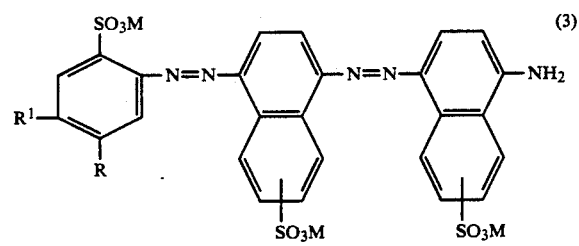

in which R, $R^1$ and M have the abovementioned meanings and which can be prepared in a conventional manner by diazotizing and coupling the corresponding components, with a halotriazine compound of the general formula (4)

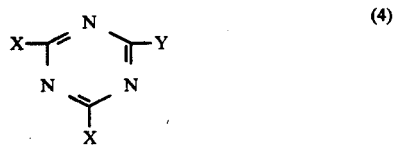

where X and Y have the abovementioned meanings, with elimination of one mole of hydrogen halide, or reacting a compound of the general formula (5)

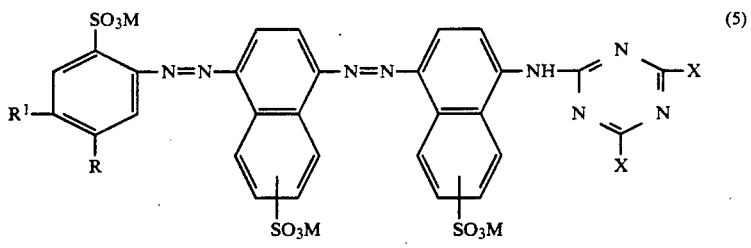

in which R, R$^1$, M and X have the abovementioned meanings and which can be fed in a conventional manner by reacting a compound of the general formula (3) with 2,4,6-dichloro- or 2,4,6-trifluoro-s-triazine (cyanuric chloride or cyanuric fluoride), with ammonia or with an amino compound of the general formula (6)

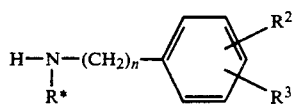

where R*, n, R$^2$ and R$^3$ have the abovementioned meanings, with elimination of one mole of hydrogen halide. The version of the process according to the invention where a compound of the general formula (3) is reacted with a compound of the general formula (4) can be carried out in an aqueous organic medium; it is preferably carried out in aqueous solution or suspension. The reaction temperature is in general between 0° and 50° C., preferably 25° and 45° C., particularly between 35° and 40° C. In general, a pH between 4 and 8, preferably between 5 and 7, is maintained. If the compound of the formula (4) is cyanuric chloride or fluoride, i.e. if in this formula X and Y are each chlorine or fluorine, the reaction preferably takes place in an aqueous suspension or in an aqueous organic medium (where the organic solvent content is for example acetone, dimethylformamide, dioxane or dimethyl sulfoxide) at a temperature between −10° C. and 30° C., preferably between +5° and +15° C., and at a pH between 4 and 6.

The reaction according to the invention between the dihalotriazine-azo compound of general formula (5) and an amino compound of the general formula (6) generally takes place, preferably without isolation of the previously prepared compound (5) from the reaction batch, in an aqueous organic solution, preferably an aqueous solution, at a temperature between 0° and 70° C., preferably between 10° and 40° C., and at a pH of between 3 and 7, in particular between 5 and 6. The reaction with ammonia takes place at a pH of about 10 and at a temperature between about 30° and 40° C.

As mentioned above, the starting compounds of the general formula (3) are obtained in a conventional manner by diazotization and coupling reaction. Diazo components which after diazotization are coupled onto a sulfo-1-amino-naphthalene compound are for example 2-sulfo-4-methoxy aniline, 2-sulfo-4-ethoxy-aniline and 2,5-disulfo-4-methoxy-aniline. The not only coupling-capable but also diazotization-capable sulfo-1-amino-naphthalene components for use as starting components of the general formula (3) are for example 6-sulfo-1-amino naphthalene and 7-sulfo-1-amino naphthalene or mixtures of the two compounds mentioned last. These diazo and coupling components are without exception known.

The disazo compounds of the general formula (1) prepared according to the invention can be precipitated and isolated from the synthesis solutions by generally known methods, for example either by precipitation from the reaction medium by means of electrolytes, such as, for example, sodium chloride or potassium chloride, or by evaporating the reaction solution, for example by spray-drying if desired after a buffer substance has been added to the synthesis solution.

The disazo compounds of the general formula (1) according to the invention—hereinafter referred to as compounds (1)—have as already mentioned fiber-reactive dye properties. They can therefore be used for dyeing (including printing) hydroxy- and/or carboxamido-containing fiber materials. It is also possible to use the solutions obtained in the synthesis of compounds (1) directly as a liquid formulation in dyeing, if desired after a buffer substance has been added and also if desired after concentration.

The present invention therefore pertains to the use of compounds (1) according to the invention for dyeing (including printing) hydroxy- and/or carboxamido-containing fiber materials by providing a process for the application thereof to these substrates. Preferably, the materials are employed in the form of textile fibers, such as yarns, wound packages and fabrics. Application can take place analogously to known procedures.

Hydroxy-containing materials are those of natural or synthetic origin, such as, for example, cellulose fiber materials or regenerated products thereof and polyvinyl alcohols. The cellulose-fiber materials are preferably cotton, but also other vegetable fibers, such as linen, hemp, jute and ramie fibers; regenerated cellulose fibers are for example staple viscose rayon and filament viscose rayon.

Carboxamodo-containing materials are for example synthetic and natural polyamides and polyurethanes in the form of fibers, for example wool and other animal hairs, silk, leather, nylon 6.6, nylon 6, nylon 11 and nylon 4.

The compounds, as provided for by the use according to the invention, can be applied to and fixed on the substrates mentioned by the application techniques known for water-soluble dyes, in particular fiber-reactive dyes, for example by taking compound (1) in a dissolved form and applying it to or incorporating it into the substrate and fixing it thereon or therein with or without heating and/or with or without the action of an alkaline agent. Such dyeing and fixing methods have been described in large numbers not only in the trade literature but also in the patent literature, for example in European Patent Application Publications Nos. 0,078,009A and 0,181,585A.

Compounds (1) produce not only on carboxamido-containing materials, such as in particular on wool, but also on hydroxy containing material, such as in particular cellulose-containing material, brown, in particular reddish brown, dyeings and prints of high color yield and good color buildup with very low temperature and alkali dependence. The dyeings and prints have good fastness properties, such as good light and wet fastness properties, such good wet light fastness properties on the dyed material moistened with tap water or an acidic or alkaline perspiration solution, furthermore good fastness to pleating, hot press fastness and crock fastness.

Of the dyeings and prints on carboxamido-containing material, in particular on wool, the light, wash and wet light fastness properties can be singled out, even if an otherwise customary ammoniacal aftertreatment of the dyed material is dispensed with. Similarly, material made of wool fibers from different provenances can be dyed level with the azo compounds according to the invention, although to improve the leveling a customary leveling assistant, for example N-methyltaurine, may be added.

Preferably, compounds (1) are used for dyeing cellulose fiber materials. Of the good fastness properties obtainable thereon, in particular the good wash fastness properties at 60° to 95° C., even in the presence of perborates, the acid and alkaline fulling, cross-dyeing and perspiration fastness properties, the high fastness to steaming, the good alkali, acid, water and seawater fastness properties and the good resistance to acid fading on storing moist acid-containing dyed material (see German Auslegeschrift 2,322,236, column 4, lines 35 to 42).

The Examples that follow serve to illustrate the invention. Parts and percentages are by weight, unless otherwise stated. Parts by weight bear the same relation to parts by volume as the kilogram to the liter.

The compounds described in these Examples in terms of formulae are shown in the form of the free acids; in general, they are prepared and isolated in the form of their sodium or potassium salts and used for dyeing in the form of their salts. In the same way the starting compounds and components mentioned in the Examples below, in particular the Table Examples, in the form of free acid can be used in the synthesis as such or in the form of their salts, preferably alkali metal salts, such as sodium or potassium salts.

The absorption maxima ($\lambda_{max}$—values) mentioned for the visible region were determined on an aqueous solution of the alkali metal salts.

EXAMPLE 1

213 parts of 4-methoxy-aminobenzene-3-sulfonic acid are diazotized in 1000 parts of water in the presence of mineral acid; 223 parts of 1-amino-naphthalene-6-sulfonic acid are added, and the coupling reaction is carried out at a pH between 4 and 5 and at a temperature between 5° and 15° C. The amino-azo compound obtained is then diazotized in a conventional manner in the presence of mineral acid, and a further 223 parts of 1-amino-naphthalene-6-sulfonic acid are added to the batch, and the second coupling reaction is carried out in accordance with the above conditions. The disazo compound obtained is isolated by salting out with sodium chloride and then added to a finely divided suspension of 194 parts of cyanuric chloride in 1000 parts of ice-water. The acylation reaction takes place at a pH of 5 and at a temperature between 5° and 20° C. After the reaction has ended (no evidence of free amino groups), the synthesis solution is clarified by adding 20 parts of diatomaceous earth an filtering at 40° to 50° C.

The disazo compound according to the invention can be isolated, if desired with addition of a buffer substance, by salting out with potassium chloride, filtration and drying or by spray drying. The result obtained is an electrolyte(predominantly potassium chloride)-containing powder of the alkali metal salt, predominantly potassium salt, of the compound according to the invention of the formula

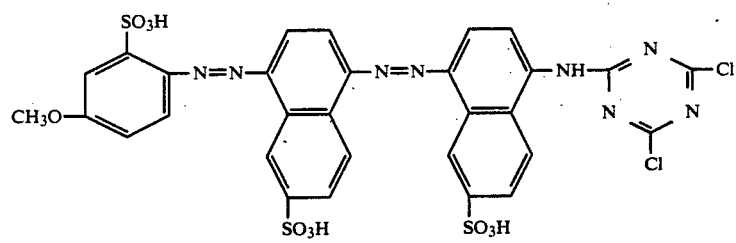

($\lambda_{max}$ = 451 nm).

This disazo compound has very good dye properties and applied to the materials mentioned in the description, in particular cellulose fiber materials, such as cotton, by the application and fixing methods as customary in the art for dyes, in particular fiber-reactive dyes, produces substantially independently of the chosen temperature and alkali concentration strong reddish brown dyeings and prints which have good fastness properties, in particular a high light fastness and high wet light fastness properties on the dyed material moistened with tapwater or a acid or alkaline perspiration solution.

EXAMPLE 2

To prepare a disazo compound according to the invention, the disazo compound of Example 1 according to the invention is taken as the starter material and reacted with 272 parts of a 25% strength aqueous ammonia solution at 40° C. for two hours. It is isolated from the synthesis solution by salting out with potassium chloride to give the potassium salt of a compound according to the invention of the formula

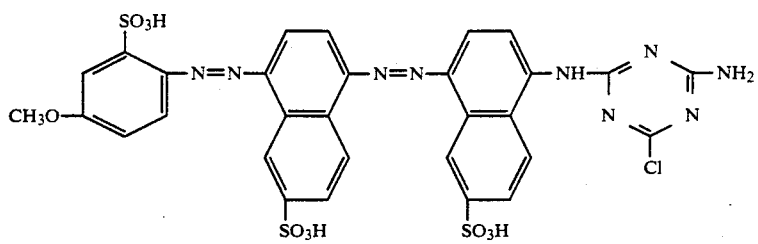

($\lambda_{max}$ = 448 nm).

This disazo compound has very good dye properties and dyes for example cotton in fast reddish brown shades.

EXAMPLE 3

To prepare a disazo compound according to the invention, the disazo compound of Example 1 according to the invention is taken as the starter material and reacted in aqueous solution at a temperature between 50° and 60° C. and at a pH between 5 and 6 with 282 parts of 4-(β-sulfatoethylsulfonyl)anilin. The disazo compound according to the invention is salted out of the synthesis solution with potassium chloride and isolated. This gives the potassium salt of a compound of the formula strong reddish brown dyeings and prints having good fastness properties, of which in particular the good light, wet light and perspiration light fastness properties can be singled out.

EXAMPLE 4 TO 13

The Table Examples below describe further disazo compounds according to the invention in terms of the variables in a general formula (A)

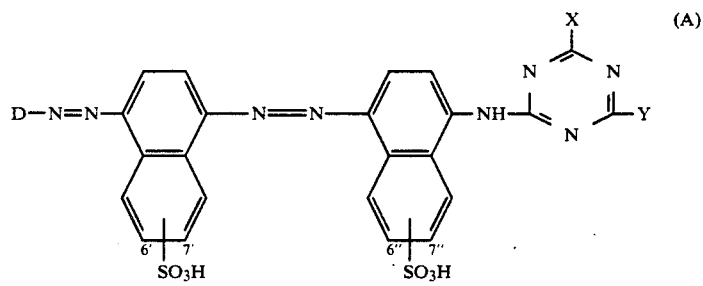

They can be prepared in a manner according to the invention, for example analogously to one of the above working Examples, from the components evident from the formula (A). They have very good fiber-reactive dye properties and applied to the materials mentioned in the description, in particular cellulose fiber materials,

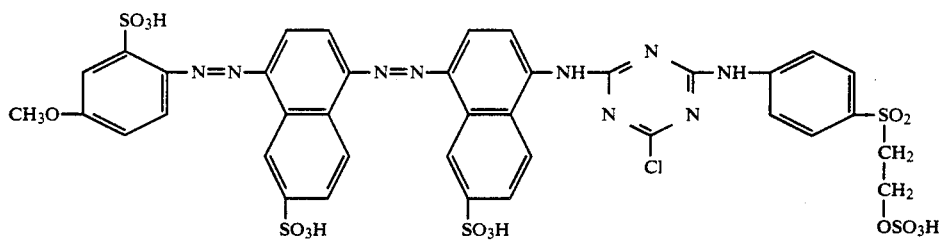

($\lambda_{max}$ = 450 nm).

This disazo compound has very good dye properties and applied to the material mentioned in the description, in particular cellulose materials, such as cotton, by the application and fixing methods as customary in the art for dyes, in particular fiber-reactive dyes, produces by the application methods as customary in the art produce strong dyeings and prints in the hue on cotton indicated in the particular Table Example which have good fastness properties.

| Ex. | Radical D | Sulfo group in ... position | Sulfo group in ... position | Radical X | Radical Y | Hue |
|---|---|---|---|---|---|---|
| 4 | 2-sulfo-4-methoxyphenyl | 6'- | 6''- | Chloro | 3-(β-sulfatoethylsulfonyl)phenylamino | Reddish brown |
| 5 | 2-sulfo-4-methoxyphenyl | 6'- | 6''- | Chloro | 4-(β-sulfatoethylsulfonyl)phenethylamino | Reddish brown |

-continued

| Ex. | Radical D | Sulfo group in ... position | Sulfo group in ... position | Radical X | Radical Y | Hue |
|---|---|---|---|---|---|---|
| 6 | 2-sulfo-4-methoxyphenyl | 6'- | 6''- | Chloro | 3-sulfo-phenyl-amino | Reddish brown |
| 7 | 2-sulfo-4-methoxyphenyl | 6'- | 6''- | Chloro | 2,5-disulfo-phenylamino | Reddish brown |
| 8 | 2-sulfo-4-methoxyphenyl | 7'- | 7''- | Chloro | Chloro | Reddish brown |
| 9 | 2-sulfo-4-methoxyphenyl | 7'- | 7''- | Chloro | 4-($\beta$-sulfato-ethylsulfonyl)phenylamino | Reddish brown |
| 10 | 2-sulfo-4-methoxyphenyl | 7'- | 7''- | Chloro | N-methyl-N-[4-($\beta$-sulfatoethyl-sulfonyl)-phenyl]-amino | Reddish brown |
| 11 | 2,5-disulfo-4-methoxyphenyl | 6'- | 6''- | Fluoro | 2-sulfo-phenyl-amino | Reddish brown |
| 12 | 2,5-disulfo-4-methoxyphenyl | 6'- | 6''- | Chloro | N-methyl-N-[4-($\beta$-sulfatoethyl-sulfonyl)-phenyl]-amino | Reddish brown |
| 13 | 2,5-disulfo-4-methoxyphenyl | 6'- | 6''- | Chloro | N-ethyl-N-[3-$\beta$-sulfatoethyl-sulfonyl)-phenyl]amino | Reddish brown |
| 14 | 2-sulfo-4-hydroxyphenyl | 6'- | 6''- | Chloro | Chloro | Reddish brown |

I claim:

1. A disazo compound of the formula

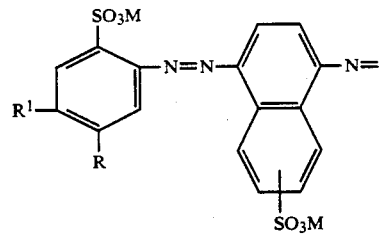
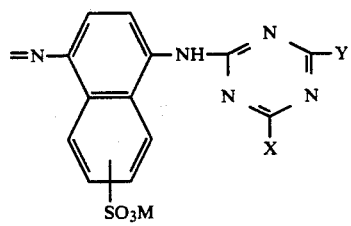

(1)

where
R is hydrogen
$R^1$ is hydroxy, methoxy or ethoxy,
M is hydrogen or an alkali metal,
X is chlorine or fluorine,
Y is chlorine or amino or a group of the formula

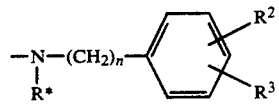

(2)

where
$R^*$ is hydrogen, methyl or ethyl,
n is zero, 1 or 2,
$R^2$ is hydrogen, sulfo, $\beta$-sulfatoethylsulfonyl or vinylsulfonyl and
$R^3$ is sulfo, $\beta$-sulfatoethylsulfonyl or vinylsulfonyl, $R^2$ and $R^3$ are identical to or different from each other.

2. A disazo compound as claimed in claim 1, wherein Y is chlorine.

3. A disazo compound as claimed in claim 1, wherein $R^1$ is methoxy.

4. A disazo compound as claimed in claim 1, wherein X is chlorine.

5. A disazo compound as claimed in claim 1, wherein n is zero.

6. A disazo compound as claimed in claim 1, wherein Y is disulfophenylamino.

7. A disazo compound as claimed in claim 1, wherein Y is di-($\beta$-sulfatoethylsulfonyl) phenylamino.

8. A compound as claimed in claim 1, wherein $R^1$ is methoxy, and X and Y are each chlorine.

9. A disazo compound as claimed in claim 5, wherein Y is chlorine.

10. A disazo compound as claimed in claim 6, wherein $R^1$ is methoxy.

11. A disazo compound as claimed in claim 7, wherein $R^1$ is methoxy.

12. A disazo compound as claimed in claim 6, wherein X is chlorine.

13. A disazo compound as claimed in claim 2, wherein n is zero.

* * * * *